United States Patent [19]
Kumar et al.

[11] Patent Number: 5,721,479
[45] Date of Patent: Feb. 24, 1998

[54] INDUCTION MOTOR BREAKDOWN SLIP PREDICTION FOR PROPULSION TRACTION APPLICATIONS

[75] Inventors: Ajith Kuttannair Kumar, Erie; Laurence Dean Vanek, Lake City, both of Pa.

[73] Assignee: General Electric Company, Erie, Pa.

[21] Appl. No.: 704,173

[22] Filed: Aug. 28, 1996

[51] Int. Cl.$^6$ .................................................. H02P 5/415
[52] U.S. Cl. ............................................ 318/801; 318/811
[58] Field of Search .................................. 318/798, 799, 318/800, 801, 802, 810, 811; 180/65.1

[56] References Cited

U.S. PATENT DOCUMENTS

| | | | |
|---|---|---|---|
| 4,629,035 | 12/1986 | Tanahashi et al. | 318/798 X |
| 4,672,288 | 6/1987 | Abbondanti | 318/803 |
| 5,278,485 | 1/1994 | Kim | 318/802 |
| 5,278,486 | 1/1994 | Kim | 318/811 |
| 5,446,362 | 8/1995 | Vanek et al. | 318/801 |
| 5,480,220 | 1/1996 | Kumar | 303/151 |

OTHER PUBLICATIONS

"Alternating Current Machines" by M. Liwschitz–Garik, et al, Second Edition, Apr. 1961, p.144.
"Induction Machines" By Phillip L. Alger, Second Edition, 1970, pp. 152–157.

*Primary Examiner*—Bentsu Ro
*Attorney, Agent, or Firm*—Ann M. Agosti; Marvin Snyder

[57] ABSTRACT

A method of controlling an inverter to provide protection for an AC traction motor includes starting the inverter and estimating a rotor cage resistance. A slip limit command is calculated from the estimated rotor cage resistance and used to control the inverter. Calculating the slip limit command can include determining a first slip limit using the rotor cage resistance, a stator leakage inductance, a rotor leakage inductance, a magnetizing leakage inductance, a number of motor poles, and a fundamental frequency of a voltage applied to the motor; determining a second slip limit using a predetermined maximum slip limit, a predetermined minimum slip limit, and a switch dependent on initial flux build up conditions; and calculating the slip limit command as the lower of the first and second slip limits. Using the slip limit command to control the inverter can include calculating a motor torque limit from the plurality of estimated temperatures; estimating a vehicle speed of a vehicle powered by the motor; using the slip limit command, the motor torque limit, the vehicle speed, and a predetermined maximum speed to determine a torque regulator slip positive limit; and providing a signal comprising the lower of the motor torque limit and the torque regulator slip positive limit to an inverter controller.

13 Claims, 11 Drawing Sheets

```
       SUB MTP13 (TQFB,VL1,SLIPRPM,TAMB,SFBTM,PWM,DIESELSPD,BSPEED,PAMB,IPHPK,IFIRST,RUNINV)
5614'
5616'  DATA SUPPLIED TO MTP13
5617'
5618'  TQFB:     MOTOR AIR GAP TORQUE (FROM INVERTER CONTROL CALCULATIONS) (lbf-ft)
5620'  VL1:      DC LINK VOLTAGE (Vdc)
5622'  SLIPRPM:  ROTOR SLIP SPEED (rpm)
5624'  TAMB:     AMBIENT TEMPERATURE (deg. C)
5626'  SFBTM:    TRACTION MOTOR SPEED FEEDBACK (rpm)-Supplied as unsigned (always positive)
5628'  PWM:      SQ. WAVE/PWM BOOLEAN (PWM=1 implies PWM mode)
5630'  DIESELSPD: ENGINE SPEED (rpm)
5632'  BSPEED:   EQUIPMENT BLOWER SPEED STATUS (0=STOP,.5=HALF,1.0=FULL)
5634'  PAMB:     ATMOSPHERIC PRESSURE (psi)
5636'  IPHPK:    PEAK VALUE OF FUNDAMENTAL PHASE CURRENT (A-peak)
5637'  RUNINV:   INVERTER STATUS BOOLEAN (RUNINV=1 implies inverter powered up,=0 implies powered down)
5638'
5641'
5642'  OUTPUT VARIABLES TO LOCOMOTIVE SYSTEM
5643'
5644'  ATEMPS:   AVERAGE STATOR TEMPERATURE (C)
5646'  ATEMPR:   AVERAGE ROTOR CAGE TEMPERATURE (C)
5648'  EBSPCM:   EQUIPMENT BLOWER SPEED COMMAND (0=STOP,.5=HALF,1.0=FULL)
5649'  TQLIM:    MOTOR TORQUE LIMIT (lbf-ft)
  ,    R1AVE:    STATOR WDG. RESISTANCE/PHASE-(Ohm) @ "ATEMPS" TEMPERATURE
  ,    R2AVE:    ROTOR CAGE RESISTANCE/PHASE-(Ohm)  @ "ATEMPR" TEMPERATURE
5650'
5651'  PARAMETERS
5652'
5654'  AEND=2473.03       CPAIR=457.66      C2S=4.1622E+04     GINS=6.3944E+02     HTOZER=120.0       MLC=37.74
5656'  AENDR=320.01       COREPU=.50        C3S=1.5719E+04     GINSE=2.6777E+04    HTOZS=90.0         OFFSET=13.491
5658'  ALPHA=.00426       CSET1=.50         C4S=8.8255E+04     G12R=2.2984E+01     KEDDY=1.2527E-05   PIE=-3.14159
5660'  AROT=2532.92       CSET2=0.0         C5S=2.2543E+05     G23R=2.2984E+01     KHBAR=3.3622       POLES=6.0
5662'  AROTX=.13          CSET3=.00039      DT=6.0             G24R=4.7717E+02     KHER=.3355         RHOB=.08074
5664'  ASTA=4940.06       CSET4=0.0         EBCONST=2.9762     G12S=2.2634E+01     KHS=6.1804         R10=.00660
5666'  ASTAX=.32          CSLL=3.9910E-08   ERTHK=1.10         G23S=2.2634E+01     K1TQ=1.1848E+05    R2BAR=.0064
5668'  BAREXT=1.0         C1CFM=.6710       FREQB=21.0         G45S=4.2316E+01     K1TQB=3.8478E+04   R2ER=.0013
5670'  CER1=5.3000E-04    C2CFM=.2560       FTOBHBAR=40.00     HDIA=.813           K1TQER=1.0848E+05  SK=2.296
5672'  CER2=4.2000E-04    C1R=7.0086E+03    FTOHER=140.00      HDIAR=.625          K2TQ=5.0000E+02    SLLPU=.50
5673'  CER3=0.0           C2R=1.2716E+05    FTOHS=150.00       HTOFBAR=50.0        K2TQB=5.0000E+02   TINIT=40.0
5674'  CER4=0.0           C3R=7.0086E+05    FWCOEF=.5207       HTOFER=150.0        K2TQER=5.0000E+02  VDROP=1.0
5678'  C1I=.060           C4R=2.5122E+05    GC3=1.1049E+03     HTOFS=170.0         LCORE=21.50        ZTOHBAR=30.0
5679'  C2I=.187           C1S=1.5719E+04    GCR3=7.5839E+02    HTOZBAR=20.0        LEND=8.12          ZTOHER=130.0
5780'                                                                                                 ZTOHS=110.0
```

Fig. 2B

```
5781 'INTIALIZATION
5782'
5784    IPH=IPHPK/SQR(2):         'FUNDAMENTAL PHASE CURRENT-RMS VALUE
5785

5790    IF IFIRST>.5THEN
5791        T1SP=TINIT
5792        T2SP=TINIT
5793        T3SP=TINIT
5794        T4SP=TINIT
5795        T5SP=TINIT
5796        T6SP=TINIT
5797        T1RP=TINIT
5798        T2RP=TINIT
5799        T3RP=TINIT
5800        T4RP=TINIT
5801        T5RP=TINIT
5803        IFIRST=0
5804    ELSE
5806        T1SP=T1S
5808        T2SP=T2S
5810        T3SP=T3S
5812        T4SP=T4S
5814        T5SP=T5S
5816        T6SP=T6S
5818        T1RP=T1S
5820        T2RP=T2R
5822        T3RP=T3R
5824        T4RP=T4R
5826        T5RP=T5R
5828    END IF

5840'
5841 'CALCULATE LOSSES
5902'
5904    IF RUNINV<1 THEN
5905        CLOSS=0
5906        W2=0
5907        FW=0
5908        IPH=0
5909        LLOSS=0
5910        WNS1=0
5911        WNS2=0
5912        WNS3=0
5913        WNBAR=0
5914        WNER1=0
5915        WNER2=0
5916        SFBTM=.1
5917    ELSE
5918        IF SFBTM<.1 THEN SFBTM=.1:     'AVOID ZERO DIVIDES @ ZERO RPM
5919        RPMS=SLIPRPM+SFBTM
            IF RPMS<.2 THEN RPMS=2:        'AVOID ZERO DIVIDE @ ZERO "RPMS"
            SLIP=1-SFBTM/RPMS
```

Fig. 2C

```
5920   FREQ=RPMS·POLES/120:                'SYNCHRONOUS SPEED-(rpm)
5922'
5923'  CALCULATE INVERTER TIME LOSSES
5924'
5925   IF PWM>0 THEN
5926     VPH=(FREQ/FREQB)·(VL1·SGN(TQFB)·VDROP·PIE·OFFSET/SQR(2)·SQR(2))/PIE+OFFSET
5927     WNS1=0
5928     WNS2=0
5929     WNS3=0
5930     WNBAR=0
5931     WNER1=0
5932     WNER2=0
5933   ELSE
5934     VPH=(VL1-SGN(TQFB)·VDROP·PIE·OFFSET/SQR(2)·SQR(2))/PIE+OFFSET
5935     WNS1=KHS·(VPH/FREQ)^2·(1+ALPHA·T1SP)·(LEND/MLC):    'STA. WDG. HARM. LOSS(W) @ OP TEMP
5936     WNS2=KHS·(VPH/FREQ)^2·(1+ALPHA·T2SP)·(LCORE/MLC):   'STA. WDG. HARM. LOSS(W) @ OP TEMP
5937     WNS3=KHS·(VPH/FREQ)^2·(1+ALPHA·T3SP)·(LEND/MLC):    'STA. WDG. HARM. LOSS(W) @ OP TEMP
5938     WNBAR=KHBAR·(VPH/FREQ)^2·SQR(FREQ)·(1+ALPHA·T2RP):  'ROT. BAR HARM. LOSS(W) @ OP TEMP
5939     WNER1=KHER·(VPH/FREQ)^2·(1+ALPHA·T1RP):  'ROT. END RING HARM. LOSS (INLET END)(W) @ OP TEMP
5940     WNER2=KHER·(VPH/FREQ)^2·(1+ALPHA·T3RP):  'ROT. END RING HARM. LOSS (DISCHARGE END)(W) @ OP TEMP
5941   END IF
5942'
5943   W2=TQFB·RPMS·SLIP/7.0402:          'FUND SECONDARY 1~R(W)
5944   FW=FWCOEF·(SFBTM/1000)^3·1000:     'FRICTION+WINDAGE(W)
5945   EF=1+KEDDY·FREQ^2:                 'STATOR SLOT EDDY FACTOR (AVE. FOR SLOT)
5946   CLOSS=CL1·(VPH/FREQ)^2·FREQ^1.5+CL2·SFBTM·(VPH/FREQ)^1.5:  'NO-LOAD CORE LOSS(W)
5947   LLOSS=CSLL·TQFB^2·FREQ-SK:         'STRAY LOAD LOSS-(W)
5948   END IF
5949'
5950   W01S=(3·IPH·2·R10)·(LEND/MLC):     'COIL DC LOSS-INLET END(W) @ ZERO DEG. C
5952   W02S=(3·IPH·2·R10)·EF·(LCORE/MLC): 'COIL DC LOSS-CORE @ ZERO DEG. C
5954   W03S=W01S:
5956   W4S=((1-COREPU)·CLOSS+LLOSS·SLLPU):  'LOSS IN STA. TEETH(W)
5958   W5S=CLOSS·COREPU:                  'CORE LOSS IN STA. YOKE(W)
5960'
5962   W1R=W2·(R2ER/(R2ER+R2BAR))/2:      'FUND. END RING LOSS @ OPERATING TEMP-(INLET END)
5964   W2R=W2·(R2BAR/(R2ER+R2BAR))+(1-SLLPU)·LLOSS:  'FUND. BAR LOSS @ OPERATING TEMP
5966   W1R=W1R:                           'FUND. END RING LOSS @ OPERATING TEMP-(DISCHARGE END)
5970'
5972   WTOT1=FW+CLOSS+LLOSS+W2+W01S·(1+ALPHA·T1SP)+W02S·(1+ALPHA·T2SP)+W03S·(1+ALPHA·T3SP): 'TOTAL FUND. LOSS (W) @
       OPERATING TEMP
5974   WTOTN=WNS1+WNS2+WNS3+WNBAR+WNER1+WNER2:  'TOTAL HARMONIC LOSS(W)
5976   WTOT=WTOT1+WTOTN
5980'  CALCULATE AIR FLOW, HEAT X-FER COEFFICIENTS & THERMAL CONDUCTANCES
5981'
5982'  SFBEB=EBCONST·DIESILSPD·BSPEED:    'EQUIP. BLWR SPEED(rpm)
5984   IF SFBEB<.1 THEN SFBEB=1
5986   CFMSTA=C1CFM·SFBEB:                'VOLUMETRIC FLOW RATE-STA.{ft^3/min.}
6002   CFMROT=C2CFM·SFBEB:                'VOLUMETRIC FLOW RATE-ROT.{ft^3/min.}
6003
```

Fig. 2D

```
6004    DENAIRS=RHOB·(PAMB/14.69)·(273/(273+T6SP));              'AIR DENSITY (LB/FT^3)-STA. CORE
6005    DENAIRR=RHOB·(PAMB/14.69)·(273/(273+T5RP));              'AIR DENSITY (LB/FT^3)-ROT. CORE
6006    MDOTS=CFMSTA·DENAIRS/60;                                 'MASS FLOW RATE-STA. (LBm/SEC)
6008    MDOTR=CFMROT·DENAIRR/60;                                 'MASS FLOW RATE-ROT. (LBm/SEC)
6009    MDOT=MDOTS+MDOTR;                                        'MASS FLOW RATE-TOTAL (LBm/SEC)
6010'
6012    HEND1=CSET1·SFBTM^.8+CSET2·MDOT;   'HEAT TRANSFER COEFF.-INLET END COILS (W/IN-2-C)
6013    HEND2=CSET3·SFBTM^.8+CSET4·MDOT;   'HEAT TRANSFER COEFF.-DISCHARGE END COILS (W/IN-2-C)
6014    HEND1R=CER1·SFBTM^.8+CER3·MDOTR;   'HEAT X-FER COEFF.-ROT END RING (INLET END) (W/IN-2-C)
6015    HEND2R=CER2·SFBTM^.8+CER4·MDOTR;   'HEAT X-FER COEFF.-ROT END RING (DISCHARGE END) (W/IN-2-C)
6016'
6017    VSTA=CFMSTA/ASTAX;                                       'STA. DUCT VELOCITY (FT/MIN)
6020    RESTA=DENAIRS·VSTA·HDIA/(720·.0000134);                  'STA. DUCT REYNOLD'S NO. (MU @ 60C)
6022    HSTA=(1.374/100000)·RESTA^.8/HDIA;                       'STA. VENT DUCT HEAT TRAN. COEFF.(w/(deg C·in^2))
6025    VROT=CFMROT/AROTX;                                       'ROT. DUCT VELOCITY (FT/MIN)
6026    REROT=DENAIRR·VROT·HDIAR/(720·.0000134);                 'ROT. DUCT REYNOLD'S NO.
6028    HROT=(1.374/100000)·REROT^.8/HDIAR;                      'ROT. VENT DUCT HEAT TRAN. COEFF.(w/(deg C·in^2))
6090'
6105    G1S=1/(1/(HEND1·AEND)+1/GINSE);                          'THERMAL CONDUCTANCE-STA. COIL END (INLET END)
6110    G3S=1/(1/(HEND2·AEND)+1/GINSE);                          'THERMAL CONDUCTANCE-STA. COIL END (DISCHARGE END)
6120    G1R=HEND1R·AENDR;                                        'THERMAL SURF. CONDUCTANCE-ROT CAGE END (INLET END)
6125    G3R=HEND2R·AENDR;                                        'THERMAL SURF. CONDUCTANCE-ROT CAGE END (DISCHARGE END)
6116    G56S=1/(1/GC3+1/(HSTA·ASTA));
6118    G45R=1/(1/GCR3+1/(HROT·AROT));
6130'
6135    GAIRS=MDOTS·CPAIR;                                       '(LB/SEC)·SPECIFIC HEAT-STA. CORE AIR RISE CONDUCTANCE
6140    GAIRR=MDOTR·CPAIR;                                       '(LB/SEC)·SPECIFIC HEAT-ROT. CORE AIR RISE CONDUCTANCE
6142    GAIR=MDOT·CPAIR;
6150'
6551'   'CALCULATE TEMPERATURES
6552'
6586    TEND1=(T1RP·G1R+T1SP·G1S+TAMB·GAIR+FW/2)/(G1R+G1S+GAIR)
6587    IF BSPEED<.5 THEN
6588       TEND2=TEND1;                                          'PREVENT OVERFLOW IN TEND2 CALC. ID BSPEED=0
6589    ELSE
6590       TEND2=WTOT/GAIR+TAMB
6592    END IF
6599    T1S=(W01S·((1+ALPHA·T1SP)+WNS1-(G1S+G12S)·T1SP+G12S·T2SP+G1S·TEND1+C1S·T1SP/DT)·DT/C1S
6600    T2S=(W02S·((1+ALPHA·T2SP)+WNS2+G12S·T1SP-(G23S+G12S+GINS)·T2SP+G23S·T3SP+GINS·T4SP+C2S·T2SP/DT)·DT/C2S
6610    T3S=(W03S·((1+ALPHA·T3SP)+WNS3+G23S·T2SP-(G3S+G23S)·T3SP+G3S·TEND2+C3S·T3SP/DT)·DT/C3S
6620    T4S=(W4S+GINS·T2SP-(GINS+G45S)·T4SP+G45S·T5SP+C4S·T4SP/DT)·DT/C4S
6630    T5S=(W5S+G45S·T4SP-(G56S+G45S)·T5SP+G56S·T6SP+C5S·T5SP/DT)·DT/C5S
6640    T6S=(T5SP·G56S+2·GAIRS·TEND1)/(G56S+2·GAIRS)
6650'
6660    T1R=(W1R+WNER1-(G1R+G12R)·T1RP+G12R·T2RP+G1R·TEND1+C1R·T1RP/DT)·DT/C1R
6670    T2R=(W2R+WNBAR-(G23R+G12R+G24R)·T2RP+G12R·T1RP+G23R·T3RP+G24R·T4RP/DT)·DT/C2R
6680    T3R=(W3R+WNER2-(G3R+G23R)·T3RP+G23R·T2RP+G3R·TEND2+C3R·T3RP/DT)·DT/C3R
6690    T4R=(G24R·T2RP-(G24R+G45R)·T4RP+G45R·T5RP+C4R·T4RP/DT)·DT/C4R
6700    T5R=(G45R·T4RP+2·GAIRR·TEND1)/(G45R+2·GAIRR)
6710    ATEMPS=(T1S·LEND+T2S·LCORE+T3S·LEND)/MLC;                                              'AVE. TEMP-STA.
6712    ATEMPR=(T1R·(ERTHK+BAREXT)+T2R·LCORE+T3R·(ERTHK+BAREXT))/(LCORE+2·BAREXT+2·ERTHK);     'AVE. TEMP-ROT.
6714    DELROT=T3R-T4R;                                          'DIFFERENTIAL TEMP. BETWEEN ROTOR END RING (DISCHARGE END) AND ROTOR CORE
6716    R1AVE=(1+ALPHA·ATEMPS)·R10;                              'AVE. STA. RESISTANCE/PHASE-(Ohm)
6718    R2AVE=(1+ALPHA·ATEMPR)·(R2BAR+R2ER)·(234.5/(234.5+110)); 'AVE. ROT. CAGE RESISTANCE/PHASE-(Ohm)
```

DICTIONARY - PARAMETERS

| | |
|---|---|
| 'AEND: | SURF. AREA OF STATOR COIL END TURNS (in^2) |
| 'AENDR: | SURF. AREA OF ROTOR CAGE END-(in^2) |
| 'ALPHA: | 1/234.5 (reciprocal of the inferred absolute zero for stator copper) |
| 'AROT: | TOT. ROT. DUCT SURFACE AREA FOR HEAT X-FER-(in^2) |
| AROTX: | TOT. ROT. DUCT X-SECT PER MACHINE -(n^2) |
| 'ASTA: | TOTAL STA. DUCT SURFACE AREA FOR HEAT X-FER-(in^2) |
| 'ASTAX: | TOT. STA. DUCT X-SECT (n^2) |
| 'BAREXT: | ROTOR BAR EXTENSION (ONE END)-(in.) |
| 'CER1: | ROTOR END AREA HEAT X-FER FACTOR (INLET END)-ROTOR SPEED COMPONENT |
| 'CER2: | ROTOR END AREA HEAT X-FER FACTOR (DICCHARGE END)-ROTOR SPEED COMPONENT |
| 'CER3: | ROTOR END AREA HEAT X-FER FACTOR (INLET END)-CORE AIR FLOW COMPONENT -([W/in^2-C]/[lbm/sec]) |
| 'CER4: | ROTOR END AREA HEAT X-FER FACTOR (DISCHARGE END)-CORE AIR FLOW COMPONENT -([W/in^2-C]/[lbm/sec]) |
| 'CL1: | CORE LOSS COEFF.-FUND. FREQ. LOSS |
| 'CL1: | CORE LOSS COEFF.-PULSATION LOSS |
| 'CPAIR: | SPECIFIC HEAT OF AIR-(W-sec)/(lbm-C) |
| 'COREPU: | (STA YOKE CORE LOSS)/(TOTAL CORE LOSS) |
| 'CSET1: | STA. END TURN HEAT X-FER FACTOR (ROTOR SPEED COMPONENT)-INLET END |
| 'CSET2: | STA. END TURN HEAT X-FER FACTOR (THRU-AIR FLOW COMPONENT)-INLET END -([W/in^2-C]/[lbm/sec]) |

*Fig. 2E*

'CSET3: STA. END TURN HEAT X-FER FACTOR (ROTOR SPEED COMPONENT)-DISCHARGE END

'CSET4: STA. END TURN HEAT X-FER FACTOR (THRU-OAIR FLOW COMPONENT)-DISCHARGE END
-([W/in^2-C]/[lbm/sec])

'CSLL: SLL COEFF.

'C1CFM: STATOR CORE CFM FRACTION-(stocfm/EBrpm)

'C2CFM: ROTOR CORE CFM FRACTION-(rotcfm/EBrpm)

'C1R: HEAT CAPACITY-ROTOR END RING (INLET END)-(W-sec/C)

'C2R: HEAT CAPACITY-ROTOR BARS-(W-sec/C)

'C3R: HEAT CAPACITY-ROTOR END RING (DISCHARGE END)-(W-sec/C)

'C4R: HEAT CAPACITY-ROTOR CORE-(W-sec/C)

'C1S: HEAT CAPACITY-STATOR COIL END TURNS (INLET END)-(W-sec/C)

'C2S: HEAT CAPACITY-STATOR COIL SLOT PORTION-(W-sec/C)

'C3S: HEAT CAPACITY-STATOR COIL END TURNS (DISCHARGE END)-(W-sec/C)

'C4S: HEAT CAPACITY-STATOR TEETH-(W-sec/C)

'C5S: HEAT CAPACITY-STATOR YOKE-(W-sec/C)

'DT: INTEGRATION INTERVAL-(sec)

'EBCONST: EQUIPMENT BLOWER CONSTANT-(EBrpm/DIESELrpm)

'ERTHK: AXIAL THK'NESS OF ROTOR CAGE END RING-(in.)

'FREQB: FREQUENCY @ PWM CORNER POINT-(Hz)

'FTOHBAR: ROT. END RING/CORE DIFFERENTIAL TEMP. BLOWER TRANSISTION TEMP.
-FULL TO 1/2 SPEED (C)

'FTOHER: ROT. END RING BLOWER TRANSITION TEMP.-FULL TO 1/2 SPEED (C)

*Fig. 2F*

| | |
|---|---|
| 'FTOHS: | STA. WDG. BLOWER TRANSISTION TEMP.-FULL TO 1/2 SPEED (C) |
| 'FWCOEF: | F&W COEFFICIENT (FORT WAYNE FORMULA) |
| 'GC3: | THERMAL CONDUCTANCE-STATOR CORE-(W/C) |
| 'GCR3: | THERMAL CONDUCTANCE-ROTOR CORE-(W/C) |
| 'GINS: | THERMAL CONDUCTANCE-STATOR SLOT COIL INSULATION-(W/C) |
| 'GINSE: | THERMAL CONDUCTANCE BETWEEN NODE 1 & 2-ROTOR BAR-(W/C) |
| 'G12R: | THERMAL CONDUCTANCE BETWEEN NODE 1 & 2-ROTOR BAR-(W/C) |
| 'G23R: | THERMAL CONDUCTANCE BETWEEN NODE 2 & 3-ROTOR CORE-(W/C) |
| 'G24R: | THERMAL CONDUCTANCE BETWEEN NODE 2 & 4-ROTOR CORE-(W/C) |
| 'G12S: | THERMAL CONDUCTANCE BETWEEN NODE 1 & 2-STATOR COIL-(W/C) |
| 'G23S: | THERMAL CONDUCTANCE BETWEEN NODE 2 & 3-STATOR CORE-(W/C) |
| 'G45S: | THERMAL CONDUCTANCE BETWEEN NODE 4 & 5-STATOR CORE-(W/C) |
| 'HDIA: | HYDRAULIC DIAMETER OF STATOR VENT DUCT-(in>) |
| 'HDIAR: | HYDRAULIC DIAMETER OF ROTOR VENT DUCT-(in>) |
| 'HTOFBAR: | ROT. END RING/CORE DIFFERENTIAL TEMP. BLOWER TRANSISTION TEMP. -1/2 TO FULL SPEED (C) |
| 'HTOFER: | ROT. END RING BLOWER TRANSITION TEMP.-1/2 TO FULL SPEED (C) |
| 'HTOFS: | STA. WDG. BLOWER TRANSITION TEMP.-1/2 TO FULL SPEED (C) |
| 'HTOZBAR: | ROT. END RING/CORE DIFFERENTIAL TEMP. BLOWER TRANSISTION TEMP. -1/2 TO ZERO SPEED (C) |
| 'HTOZER: | ROT. END RING BLOWER TRANSITION TEMP.-1/2 TO ZERO SPEED (C) |
| 'HTOZS: | STA. WDG. BLOWER TRANSITION TEMP.-1/2 TO ZERO SPEED (C) |

*Fig. 2G*

| | |
|---|---|
| 'KEDEDY: | CONSTANT USED IN STATOR SLOT EDDY FACTOR CALCULATION |
| 'KHBAR: | ROT .BAR TIME HARMONIC LOSS COEFF.-DEFINED AT ZERO C |
| 'KHER: | ROT. CAGE END RING TIME HARMONIC LOSS COEFF.(PER END RING)-DEFINED AT ZERO C |
| 'KHS: | STA. WDG. TIME HARMONIC LOSS COEFF.-DEFINED AT ZERO C |
| 'K1TQ: | STA. WDG. DERATING FACTOR (220C IS S.S. LIMIT)-(lbf-ft) |
| 'K1TQB: | ROT. BAR EXT. STRESS DERATING FACTOR (50C IS S.S. LIMIT)-(lbf-ft) |
| 'K1TQER: | ROT. END RING DERATING FACTOR (200C IS S.S. LIMIT)-(lbf-ft) |
| 'K2TQ: | STA. WDG. DERATING FACTOR-(lbf-ft/C) |
| 'K2TQB: | ROT. BAR EXT. STRESS DERATING FACTOR-(lbf-ft/C) |
| 'K2TQER: | ROT. END RING DERATING FACTOR-(lbf-ft/C) |
| 'LCORE: | CORE LENGTH-(in.) |
| 'LEND: | AXIAL LENGTH OF COIL END TURN/END-(in.) |
| 'MLC: | MEAN LENGTH OF COIL-(in.) |
| 'OFFSET: | INVERTER VOLTAGE OFF-SET @ ZERO SPEED-(Vph-ms) |
| 'PIE: | 3.14159 |
| 'POLES: | NUMBER OF MOTOR POLES |
| 'RHOB: | DENSITY OF AIR @ SEA LEVEL & ZERO C-(Ohm) |
| 'R10: | STATOR WDG. RESISTANCE/PHASE @ ZERO C-(Ohm) |
| 'R2BAR: | ROTOR CAGE RESISTANCE @ 110C-BAR CONTRIBUTION ONLY-(Ohm) |
| 'R2ER: | ROTOR CAGE RESISRANCE @ 110C-END CONTRIBUTION ONLY-(Ohm) |

*Fig. 2H*

| | |
|---|---|
| 'SK: | SLL FREQ. EXPONENT |
| 'SLLPU: | (STA TEETH SLL)/(TOTAL SLL) |
| 'TINIT: | INITIAL TEMPERATURE (C) |
| 'VDROP: | INVERTER VOLTAGE DROP (Vdc) |
| 'ZTOHBAR: | ROT. END RING/CORE DIFFERENTIAL TEMP. BLOWER TRANSITION TEMP. −ZERO TO 1/2 SPEED (C) |
| 'ZTOHER: | ROT. END RING BLOWER TRANSITION TEMP.−ZERO TO 1/2 SPEED (C) |
| 'ZTOHS: | STA. WDG. BLOWER TRANSITION TEMP.−ZERO TO 1/2 SPEED (C) |

DICTIONARY−OUTPUT VARIABLES

| | |
|---|---|
| 'ATEMPR: | AVERAGE ROTOR CAGE TEMPERATURE (C) |
| 'ATEMPS: | AVERAGE STATOR TEMPERATURE (C) |
| 'EBSPCM: | EQUIPMENT BLOWER SPEED COMMAND (0=STOP,.5=HALF,1.0=FULL) |
| 'R1AVE: | STATOR WDG. RESISTANCE/PHASE−(Ohm) @ "ATEMPS" TEMPERATURE |
| 'R2AVE: | ROTOR CAGE RESISTANCE/PHASE−(Ohm) @ "ATEMPR" TEMPERATURE |
| 'TQLIM: | MOTOR TORQUE LIMIT−LIMITING CASE−(lbf−ft) |
| 'T2S: | STA. COIL TEMP. (DISCHARGE END)−(deg.C) |
| 'T3R: | ROT. END RING TEMP. (DISCHARGE END)−(deg.C) |
| 'SLIP: | ROTOR SLIP−(Per Unit) |

*Fig. 21*

INDUCTION MOTOR BREAKDOWN SLIP PREDICTION FOR PROPULSION TRACTION APPLICATIONS

SPEECH INFORMATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

This invention relates generally to a control system for an AC traction motor and, more particularly, to a system using information measured and supplied by a vehicle propulsion system controller to predict traction induction motor slip speed at maximum torque (breakdown) conditions in near real time and control the operation of the inverter connected to the motor by adjusting a slip limit command.

A system of thermal protection for AC traction motors using temperature estimations to calculate torque limits and blower speed requirements was disclosed in commonly assigned Vanek et al., U.S. Pat. No. 5,446,362, issued Aug. 29, 1995. In Vanek et al., the thermal protection apparatus for a motor having a stator, a rotor, a blower fan, and an inverter includes measuring apparatus for measuring ambient air temperature of the motor and atmospheric air pressure of the motor. A computer is provided for using the measured ambient air temperature and atmospheric air pressure values for estimating a plurality of temperatures in the AC traction motor and for calculating a plurality of motor torque limits imposed by the plurality of estimated temperatures. A control system is provided for controlling the inverter by providing a signal comprising the lowest of the calculated plurality of motor torque limits to an inverter controller. The control system can also be used to calculate a plurality of blower speed requirements imposed by the plurality of estimated temperatures and set the blower speed of the motor to the highest of the calculated plurality of blower speed requirements.

The system of Vanek et al. is useful for calculating torque limits and blower speed requirements. However, conventionally obtained design margins can limit propulsion system torque capability at maximum vehicle speeds.

SUMMARY OF THE INVENTION

It would be desirable to reduce such system design margins to allow for increased propulsion system torque capability at maximum vehicle speeds. In the present invention, accurate predictions of traction induction motor slip speed at maximum torque conditions (breakdown conditions) are used to reduce the system design margin. The predictions of traction induction motor slip speed at maximum torque conditions can be made using inductance parameters and a rotor cage resistance estimation.

Briefly, in accordance with an embodiment of the present invention, a method of controlling an inverter to provide protection for an AC traction motor includes starting the inverter, estimating a rotor cage resistance, calculating a slip limit command from the estimated rotor cage resistance, and using the slip command to control the inverter. Calculating the slip limit command can include determining a first slip limit using the rotor cage resistance, a stator leakage inductance, a rotor leakage inductance, a magnetizing leakage inductance, a number of motor poles, and a fundamental frequency of a voltage applied to the motor; determining a second slip limit using a predetermined maximum slip limit, a predetermined minimum slip limit, and a switch dependent on initial flux build up conditions; and calculating the slip limit command as the lower of the first and second slip limits.

In one embodiment, determining the second slip limit includes subtracting a previous value of the second slip limit from the maximum slip limit to obtain a differential slip limit; limiting the magnitude of the differential slip limit to a predetermined value; adding the limited differential slip limit to the previous value of the second slip limit to obtain an adjusted slip limit; determining a maximum of the adjusted slip limit and the minimum slip limit; if the initial flux build up is not complete, determining the second slip limit as the minimum slip limit; and, if the initial flux build up is complete, determining the second slip limit as the maximum of the adjusted slip limit and the minimum slip limit.

Although a preferred embodiment includes comparing the first and second slip limits, in another embodiment, the second slip limit is obtained and used as the slip limit command. The second slip limit is useful because it provides a technique for providing a minimum required slip during flux build up and a slow ramp up to a maximum permitted slip during operation.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

FIGS. 2A–2I include computer source code listings and dictionaries of parameters and output variables which can be used to by a computer to provide data for use in accordance with the present protection method.

DETAILED DESCRIPTION OF A PREFERRED EMBODIMENT OF THE INVENTION

Figure 1A:
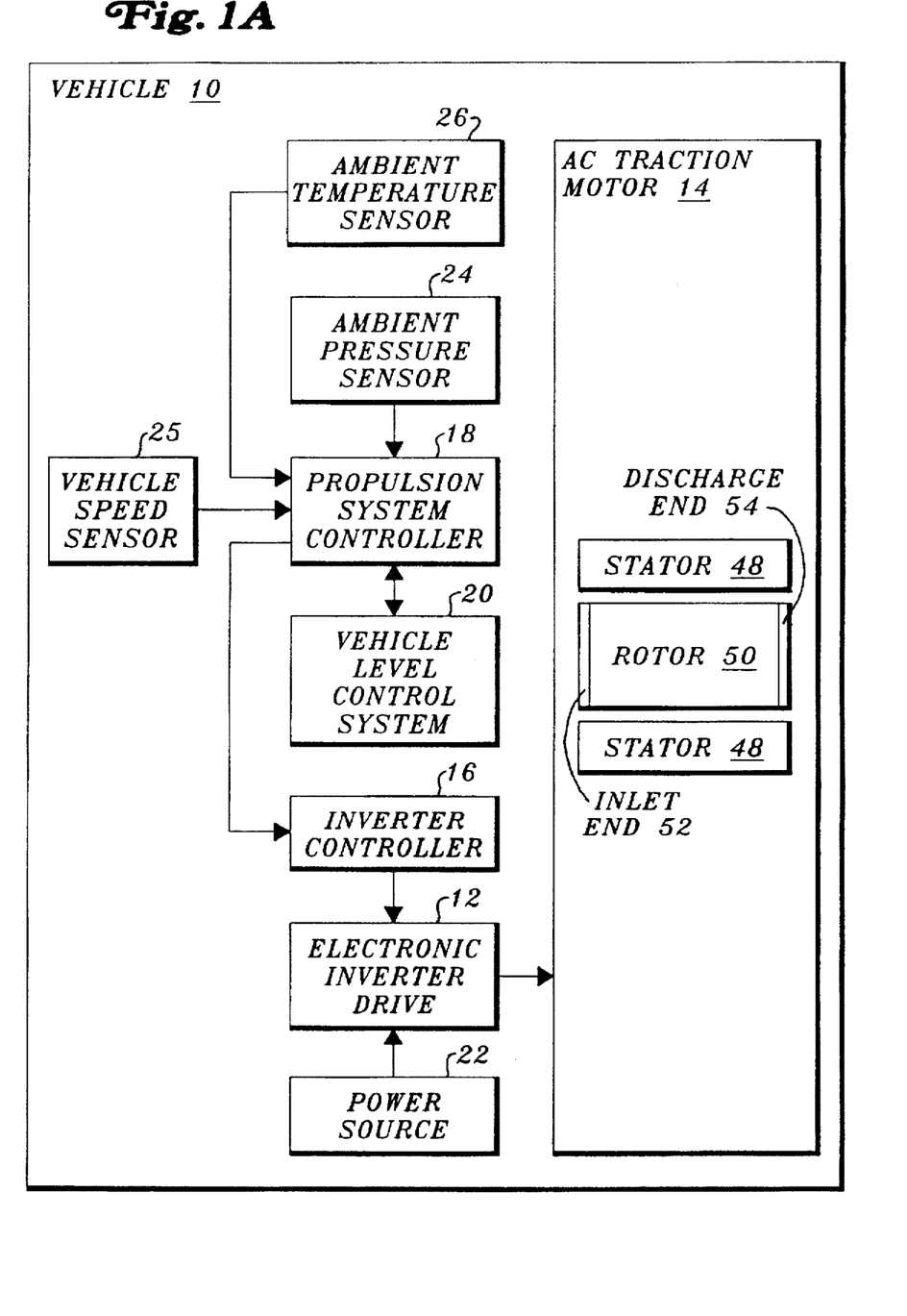
FIG. 1A is a block diagram of a vehicle AC propulsion system.

FIG. 1A is a block diagram of a vehicle 10 AC propulsion system. A vehicle power source 22 may comprise any desired power source including, for example, a diesel engine/alternator, battery, or wayside power source such as a third rail or high voltage catenary. Electrical power is conditioned by solid state inverter drives shown as inverters 12 (only one of which is shown in FIG. 1A) which have respective inverter controllers 16 to regulate the voltage and frequency applied to respective AC traction motors 14 in a manner consistent with the needs of the vehicle application. Inverters 12 are coordinated by a single propulsion system controller (PSC) 18 which controls each respective inverter controller and inverter for each axle (axles not shown) of the vehicle. A vehicle level control system 20 can be used to send commands to PSC 18. Ambient temperature sensor 26, ambient pressure sensor 24, and vehicle speed sensor 25 supply data to the propulsion system controller. AC traction motor 14 includes a stator 48 and a rotor 50 having an inlet end 52 and a discharge end 54.

Figure 1B:
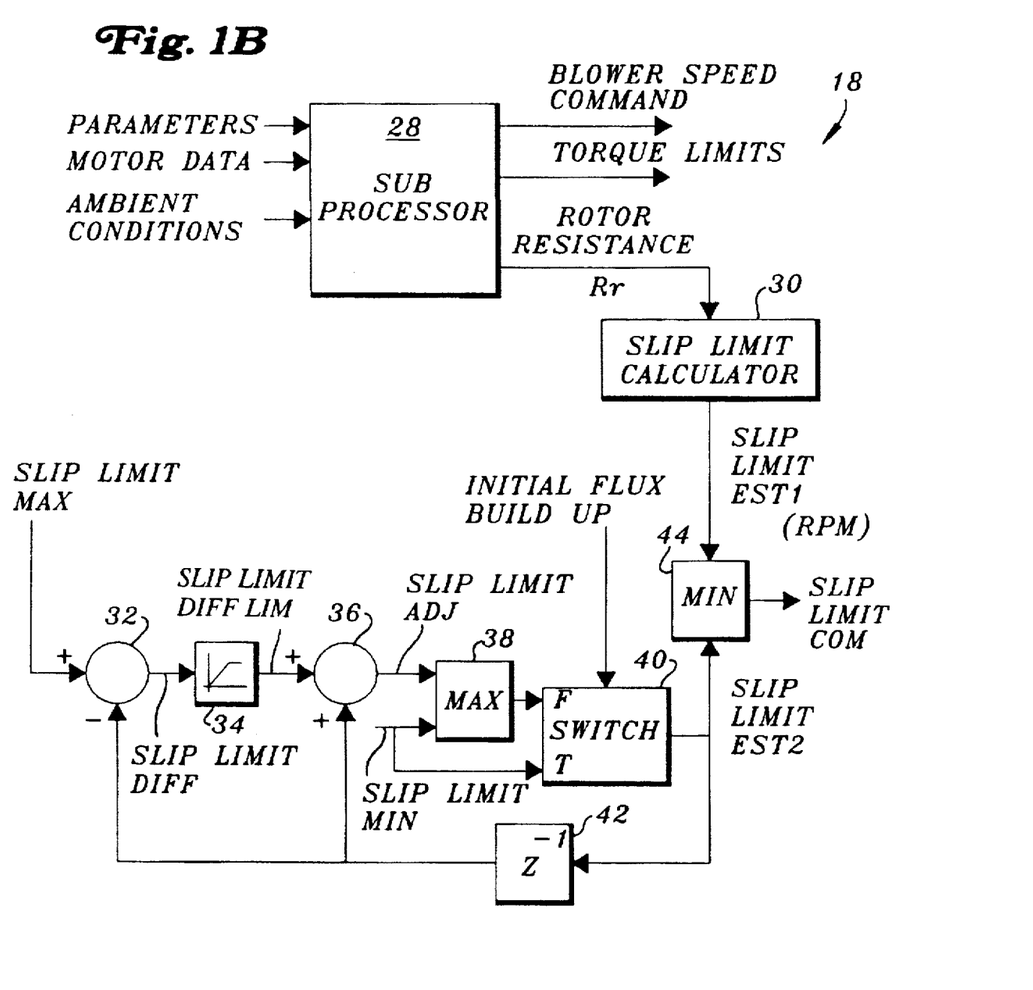
FIG. 1B is a block diagram of an inverter controller of the present invention.
Figure 2B:
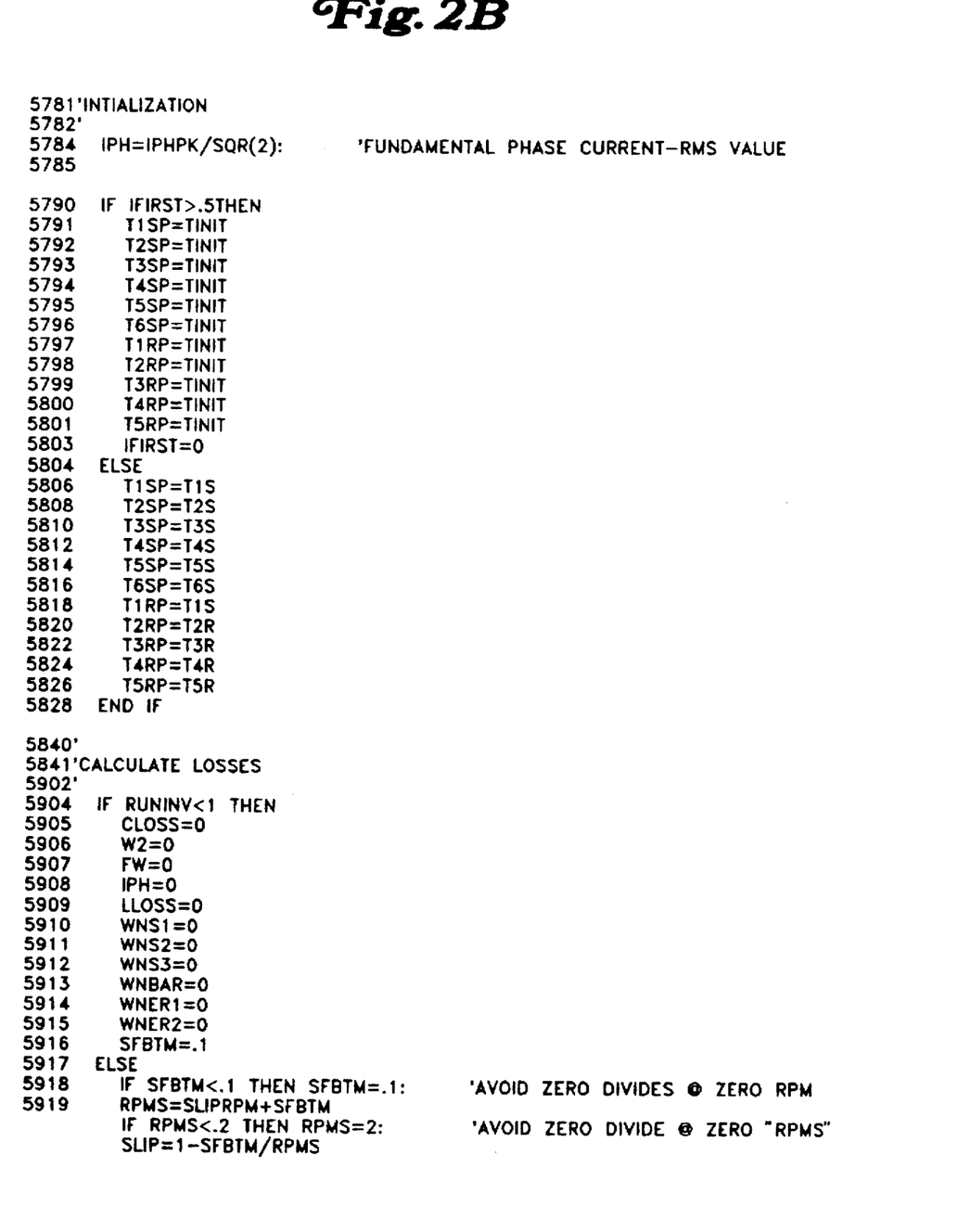
Figure 2E:
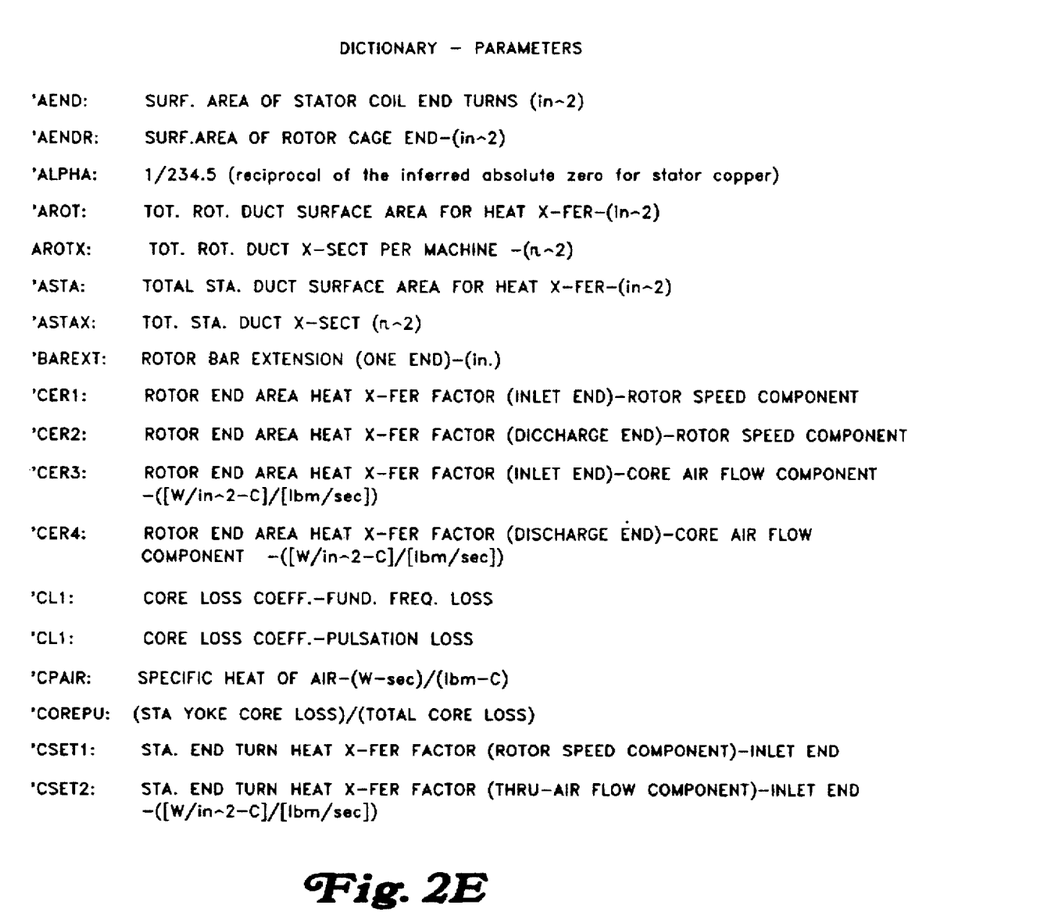
Figure 2F:
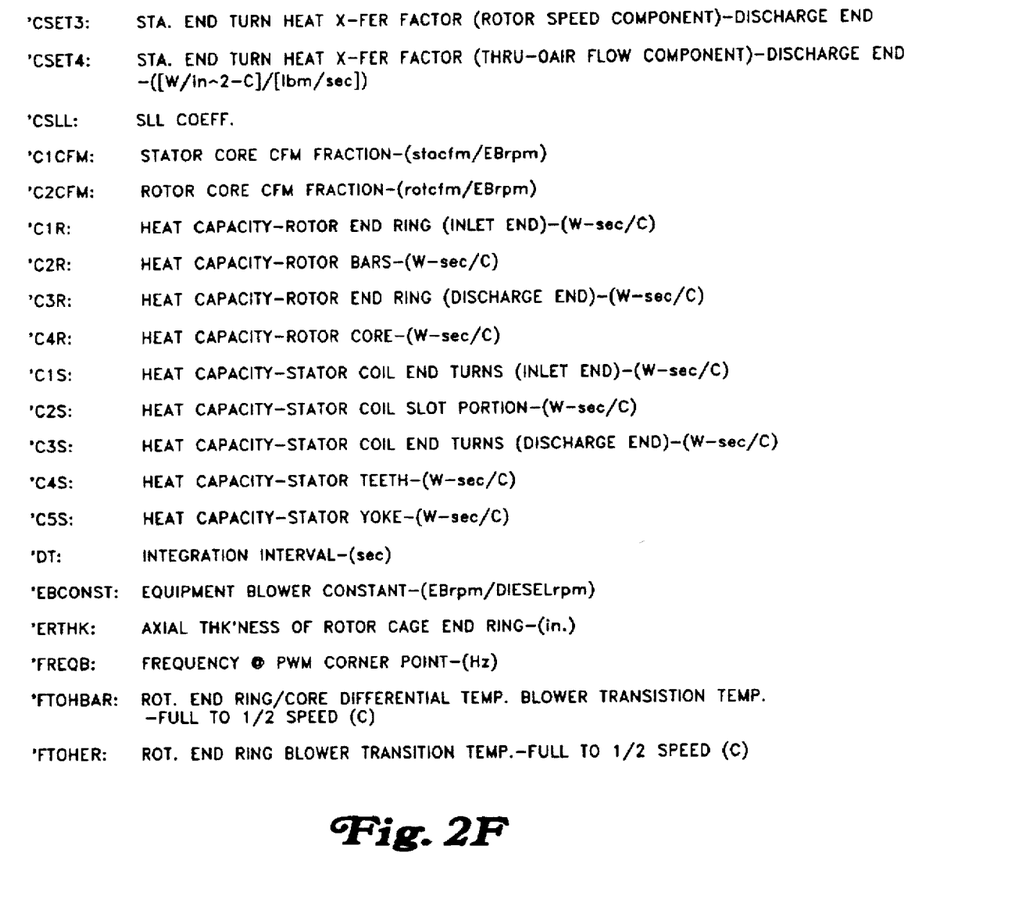
Figure 2G:
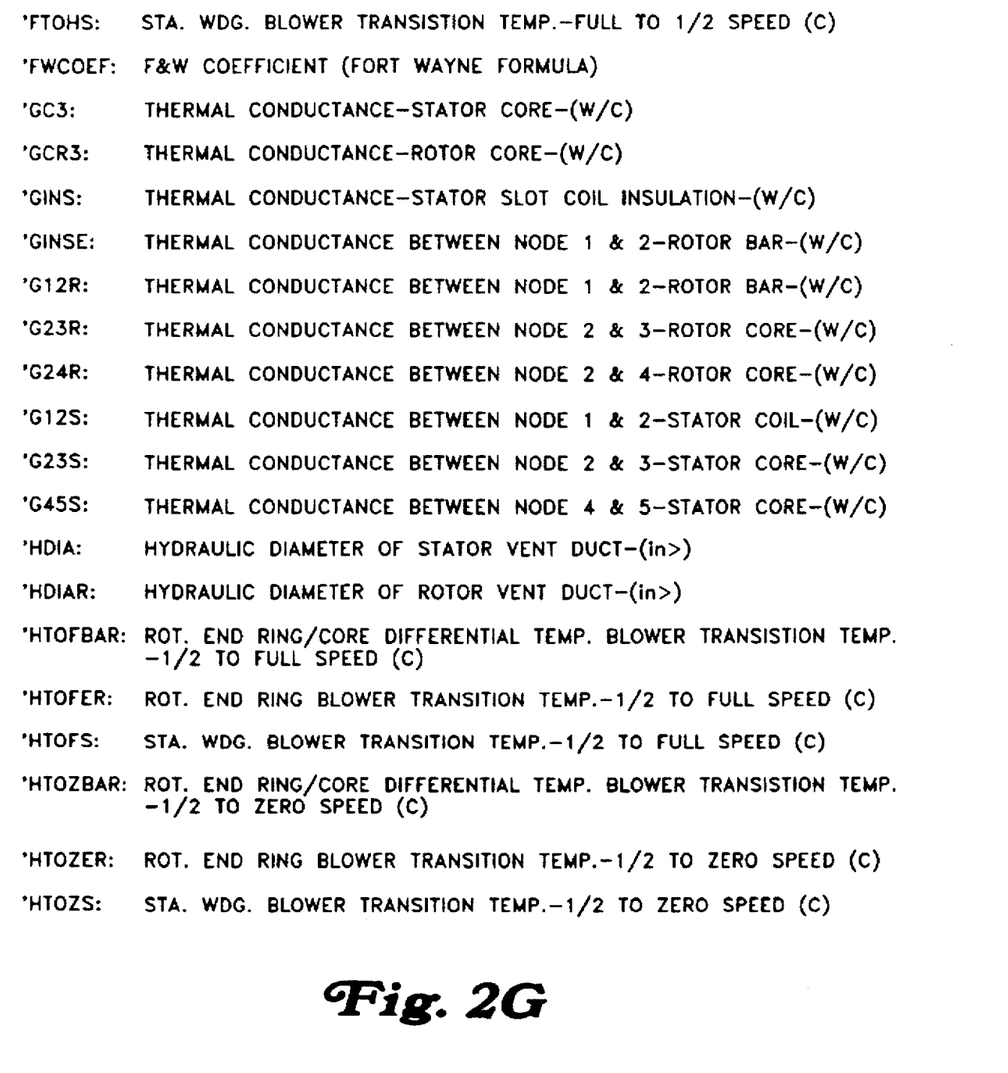
Figure 2H:
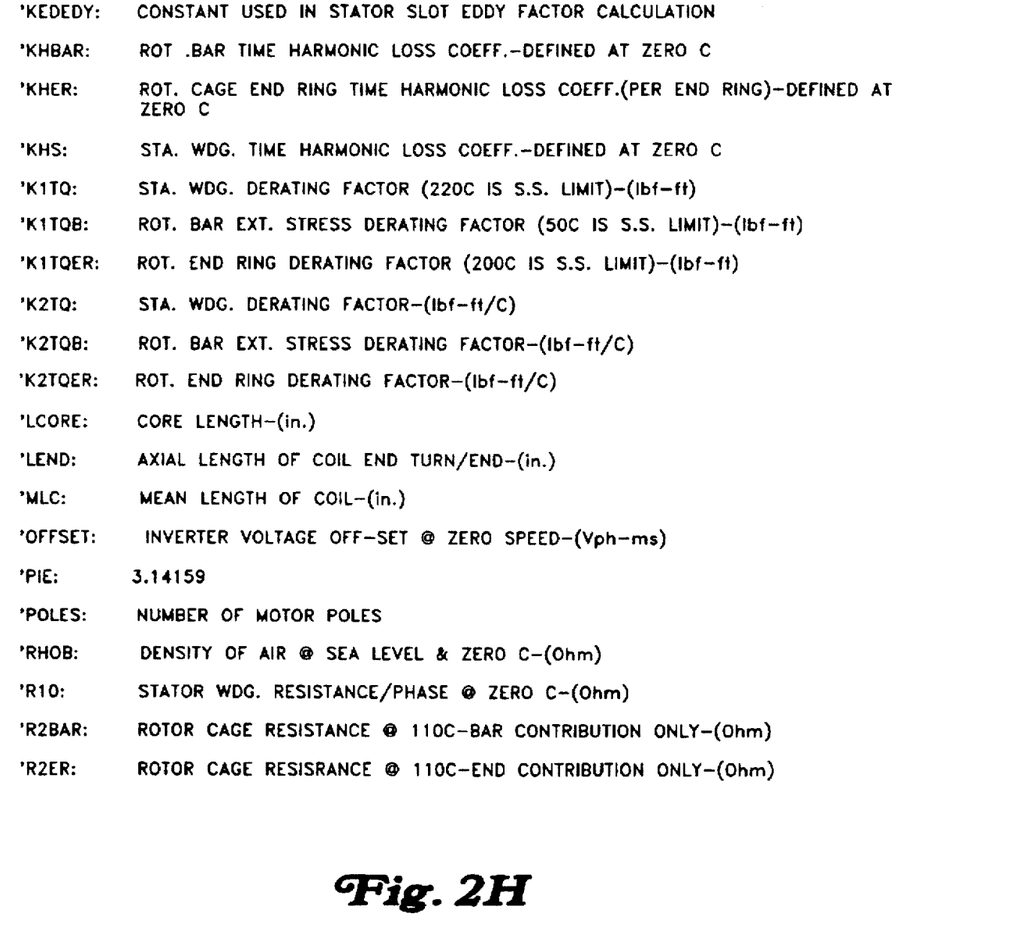

FIG. 1B is a block diagram of an inverter controller of the present invention. A sub-processor 28 processes motor data, motor parameters, and ambient conditions sensed by temperature sensor 26 and pressure sensor 24 (shown in FIG. 1A) to obtain, as disclosed in aforementioned Vanek et al., U.S. Pat. No. 5,446,362, a torque limit, a blower speed command, and a rotor cage resistance estimation. The rotor cage resistance estimation is used in the present invention at slip limit calculation device 30.

FIGS. 2A–2I include computer source code listings, a dictionary of parameters, and a dictionary of output variables which can be used to by a computer to provide data for use in accordance with the present protection method. The equations shown in the algorithm of FIGS. 2A–2I are all for purposes of example only. There are a number of techniques for modeling the losses, temperatures, and rotor cage resistance, and the invention is not limited to the specific techniques shown in FIGS. 2A–2I.

In one embodiment, the flowchart software resides within the propulsion system controller (PSC) 18 and is executed by an on-board microprocessor. When PSC 18 is active, the protection system is executed continuously at regular intervals for each vehicle traction motor using the input signals defined above. At the conclusion of each interval, the output signals are passed to vehicle system controller 20.

Briefly, as disclosed in aforementioned Vanek et al., U.S. Pat. No. 5,446,362, after the inverter is started, the ventilating air ambient temperature and the atmospheric pressure of ventilating air are measured in the local area ambient in which the motor is operated. The measured ambient temperature and atmospheric pressure, as well as additional vehicle system input signals (motor data) are supplied to the algorithm. Initial temperature variables are set and the phase current RMS value is calculated.

Then, if necessary, the protection system is initialized by setting each of stator and rotor node temperature to an initial temperature value TINT which is calculated for each node using the equation:

$$TINT = (T_p - Tamb_p) * e^{-t/const} + Tamb,$$

wherein $T_p$ is the previous temperature stored immediately prior to inverter shut down; Tamb is the present ambient temperature; $Tamb_p$ is the previous ambient temperature; t is the elapsed time in minutes since PSC 18 has been without power; and const is the machine thermal time constant in minutes assuming a rotor at a standstill with no ventilation. The time constant, which varies with motor size, is 34.6 minutes in one embodiment.

The temperature at the inlet end of the motor is calculated using the formula on line 6586 of FIG. 2D. To determine the temperature at the outlet end of the motor, the input value of BSPEED (blower speed) is evaluated. If BSPEED is less than 0.5, then the outlet air end air temperature is set to equal the inlet end air temperature because the blower is off. If BSPEED is not less than 0.5, then the air temperature at the outlet end of the motor is calculated with the total fundamental and harmonic losses (lines 5926–5976 of FIG. 2C), the total air rise conductance (lines 5926–5976 of FIG. 2C), and the ambient temperature, as shown in the equation of line 6590 of FIG. 2D.

In one embodiment, the stator and rotor nodal temperatures are calculated with numerical integration of system differential equations. For example, numerical integration methods such as Runge-Kutta methods or, as shown in lines 6595–6700 of FIG. 2D, Euler's method, can be used. The rotor and stator average temperatures and the rotor endring and rotor core differential temperatures are calculated using the equations in lines 6710–6714 of FIG. 2D. The average rotor cage resistance per phase (ohm) R2AVE and the average stator resistance per phase (ohm) R1AVE are calculated using motor specific constants and the calculated average rotor and stator temperatures using, for example, the equations in lines 6716–6718 of FIG. 2D.

Referring again to FIG. 1B, sub-processor 28 supplies the average rotor cage resistance per phase R2AVE, which is hereinafter referred to as rotor cage resistance $R_r$, to the slip limit calculator 30.

The slip limit calculator additionally receives the following fixed parameters which are characteristic for each particular motor's electrical design:

Ls: unsaturated stator leakage inductance/phase (H)

Lr: unsaturated rotor leakage inductance/phase (H)

Lm: unsaturated magnetizing leakage inductance/phase (H)

f: fundamental frequency of voltage applied to motor (Hz)

P: number of poles.

To obtain an estimated maximum slip speed limit $sliplimit_{est1}$, the slip limit calculator then performs the following equation:

$$sliplimit_{est1} = \frac{120 Rr}{2\pi P} \left( \frac{Lm + Ls}{LmLs + LmLr + LrLs} \right).$$

$Sliplimit_{est1}$ is then compared to a $sliplimit_{est2}$, which is determined as discussed below, with the smaller of the two signals being used (as determined by minimum calculator 44) as a slip limit command ($sliplimit_{COM}$) to adjust the inverter.

Maximum slip limit ($sliplimit_{max}$) and minimum slip limit ($sliplimit_{min}$) are predetermined values of slip which are set according to specific traction motor requirements and capabilities. In one embodiment, the minimum slip limit is set to 30 (RPM) and the maximum slip limit is set to 50 or 60 (RPM).

At switch 40, if it is determined that initial flux has not yet been built up to a point where the flux is approximately equal to that which would be expected based on DC (direct current) voltage value and speed (condition T), then the $sliplimit_{min}$ value will be used as the $sliplimit_{est2}$ for comparison with the $sliplimit_{est1}$. After the initial flux build up is complete (condition F), switch 40 will send a $sliplimit_{est2}$ signal based on the maximum (as determined by maximum calculator 38) of the $sliplimit_{min}$ and an adjusted maximum slip limit ($sliplimit_{adj}$).

A limiter 34 is used to slowly ramp up the $sliplimit_{adj}$. First the previous value of the $sliplimit_{est2}$ (which is held by element 42) is subtracted from the $sliplimit_{max}$ with the resulting differential slip limit ($sliplimit_{diff}$) then being scaled, if necessary, by limiter 34 to provide a limited differential slip limit ($sliplimit_{difflim}$). For example, in one embodiment, if the $sliplimit_{diff}$ is greater than 1 RPM, the $sliplimit_{difflim}$ can be clipped to 1 RPM, and if the $sliplimit_{diff}$ is less than or equal to 1 RPM, the $sliplimit_{difflim}$ is unchanged from the $sliplimit_{diff}$. $Sliplimit_{difflim}$ is then added to the $sliplimit_{est2}$ to provide the $sliplimit_{adj}$. Thus, for every execution of the loop, $sliplimit_{adj}$ increases at a rate controlled by the number of executions per second and the maximum limit of limiter 34 until $sliplimit_{adj}$ becomes equal to sliplimit$_{max}$. After the flux has built up, because sliplimit$_{adj}$ is always greater than sliplimit$_{min}$, sliplimit$_{adj}$ will be passed on to sliplimit$_{est2}$. So sliplimit$_{est2}$ will ramp from sliplimit$_{min}$ to sliplimit$_{max}$ after the initial flux build up is false (no longer occurring). Therefore, sliplimit$_{COM}$ will ramp from sliplimit$_{min}$ to either sliplimit$_{max}$ or sliplimit$_{est1}$. Typically sliplimit$_{est1}$ will be less than sliplimit$_{max}$ because the level of sliplimit$_{max}$ is normally selected to be above the slip required for the hottest motor. Once sliplimit$_{est1}$ is in control, then sliplimit$_{COM}$ will follow the slip limit dictated by the motor temperature up to the sliplimit$_{max}$. Thus this embodiment provides for the limiting of current initially because the slip is limited to a minimum value, and, after the flux has been built up, the slip limit is moved to the required operating limit under a controlled ramp. The initial minimum limit followed by a controlled ramp also ensures that the torque does not overshoot when the flux builds up.

After the sliplimit$_{COM}$ is determined, the value can be used to limit the slip in a motor by a technique such as disclosed in commonly assigned Kumar, U.S. Pat. No. 5,480,220, for example, wherein a slip limit (MSPM, as shown in FIG. 3 of Kumar) is compared with another slip limit value which is determined using a maximum speed value, an actual speed value, and a torque limit command, and the minimum of the two slip limit values is used to set a torque regulator slip positive limit (TRSPM).

The protection system thereby can use the slip limit command to adjust the torque limit command and control operation of the inverter. This "adjustment" will result in a change of torque limit due to slip limit analysis only if the latest slip limit command is different than the previous slip limit command.

The present invention can be used to reduce the propulsion system design margin because a predetermined value of maximum permissible motor torque can be set to a higher value in reliance upon the use of slip speed analysis for predicting breakdown conditions. Thus, the maximum permissible motor torque for a given motor can be increased using the present invention. Alternatively, if the maximum permissible motor torque is sufficiently large for a particular application, cost savings can be achieved using the present invention to decrease the motor size while maintaining the same value for the maximum permissible motor torque.

Unlike the present invention wherein the slip limit is based on the present operating condition of the motor, the slip limit of a conventional system is fixed. In one conventional embodiment, the slip limit is based on the coldest operating conditions of the motor, and, when the motor heats up, such slip limit will limit the amount of torque the motor can produce. Thus, the motor/axle rating will be the hot motor's capability with the cold motor slip limit. These prior control implementations could limit motor capability at levels in some cases, depending on the motor construction and temperature range, by about 30%.

Another conventional technique is to base the slip limit on hottest motor operating conditions. In this case, when a motor is running normally it will be colder compared to the maximum temperature. Hence, the slip limit is not effective because the slip limit enforced due to the hottest motor is beyond the breakdown torque capability of the motor.

Although the preferred embodiment of the present invention includes determining and comparing sliplimit$_{est1}$ and sliplimit$_{est2}$, in another embodiment of the present invention, sliplimit$_{est2}$ is obtained and used as the slip limit command (sliplimit$_{COM}$) without comparison to a sliplimit$_{est1}$.

Generally it is preferable to operate an induction motor well within the breakdown torque limit because, as the operation becomes closer to the breakdown torque region, the amount of current required to produce torque increases. At low speeds with nominal voltages, it is generally not required to operate near the breakdown torque limit. The only time operation near the breakdown torque limit is needed is at very high speeds or at high speeds with low input voltages where the flux on the machine is low.

Elements 32, 34, 36, 38, 40, and 42 of FIG. 1B, which are used for obtaining sliplimit$_{est2}$, limit the slip of the machine to low levels until the flux builds up and then limit the increase in the slip at a controlled rate until the slip limit reaches a desired level. Under normal operation at low speeds, sliplimit$_{min}$ is not generally reached. At starting, the flux in the machine is low, and to produce torque, at least a minimum level of slip is needed. The embodiment of FIG. 1B provides the minimum level (sliplimit$_{min}$) and thus controls the slip and hence the current until the flux builds up. In a conventional locomotive or transit application, the torque is applied at a ramped rate. Limiting the slip to a minimum value, as in the embodiment of FIG. 1B, also helps prevent overshoot in torque as the flux builds up.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method of controlling an inverter to provide protection for an AC traction motor including a rotor and a stator comprising the steps of:
   starting the inverter; and
   protecting the AC traction motor by
      estimating a rotor cage resistance of the AC traction motor,
      calculating a slip limit command using the estimated rotor cage resistance, and
      using the slip limit command to control the inverter.

2. The method of claim 1, wherein the step of estimating the rotor cage resistance includes
   measuring ambient air temperature of the motor,
   measuring atmospheric air pressure of the motor,
   estimating a plurality of temperatures in the AC traction motor with the ambient air temperature and atmospheric air pressure, and
   estimating the rotor resistance with the estimated plurality of temperatures in the AC traction motor.

3. The method of claim 2, wherein the step of calculating the slip limit command includes:
   determining a first slip limit using the rotor cage resistance, a stator leakage inductance, a rotor leakage inductance, a magnetizing leakage inductance, a number of motor poles, and a fundamental frequency of a voltage applied to the motor;
   determining a second slip limit using a predetermined maximum slip limit, a predetermined minimum slip limit, and a switch dependent on initial flux build up conditions; and
   calculating the slip limit command as the lower of the first and second slip limits.

4. The method of claim 3, wherein determining the second slip limit includes:
   subtracting a previous value of the second slip limit from the maximum slip limit to obtain a differential slip limit;
   limiting the magnitude of the differential slip limit to a predetermined value;
   adding the limited differential slip limit to the previous value of the second slip limit to obtain an adjusted slip limit;

determining a maximum of the adjusted slip limit and the minimum slip limit;

if the initial flux build up is not complete, determining the second slip limit as the minimum slip limit;

if the initial flux build up is complete, determining the second slip limit as the maximum of the adjusted slip limit and the minimum slip limit.

5. The method of claim 2, wherein the step of using the slip limit command to control the inverter includes:

calculating a motor torque limit from the plurality of estimated temperatures;

estimating a vehicle speed of a vehicle powered by the motor;

using the slip limit command, the motor torque limit, the vehicle speed, and a predetermined maximum speed to determine a torque regulator slip positive limit; and providing a signal comprising the lower of the motor torque limit and the torque regulator slip positive limit to an inverter controller.

6. A protection apparatus for an AC traction motor including a stator, a rotor, and an inverter, comprising:

a propulsion system controller for estimating a rotor cage resistance and using the rotor cage resistance to determine a slip limit command; and an inverter controller for using the slip limit command to control the inverter.

7. The apparatus of claim 6, further including a sensor for measuring ambient air temperature of the motor;

a sensor for measuring atmospheric air pressure of the motor; and wherein the propulsion system controller includes means for using the measured ambient air temperature and atmospheric air pressure for estimating a plurality of temperatures in the AC traction motor and using the plurality of estimated temperatures to estimate the rotor cage resistance.

8. The apparatus of claim 7, further including a sensor for estimating a vehicle speed of a vehicle powered by the motor and wherein the inverter controller includes:

means for calculating a motor torque limit from the plurality of estimated temperatures;

means for using the slip limit command, the motor torque limit, the vehicle speed, and a predetermined maximum speed to determine a torque regulator slip positive limit; and means for providing a signal comprising the lower of the motor torque limit and the torque regulator slip positive limit to the inverter.

9. The apparatus of claim 6, wherein the propulsion system controller includes:

means for determining a first slip limit using the rotor cage resistance, a stator leakage inductance, a rotor leakage inductance, a magnetizing leakage inductance, a number of motor poles, and a fundamental frequency of a voltage applied to the motor;

means for determining a second slip limit using a predetermined maximum slip limit, a predetermined minimum slip limit, and a switch dependent on initial flux build up conditions; and means for calculating the slip limit command as the lower of the first and second slip limits.

10. The apparatus of claim 9, wherein the means for determining the second slip limit includes:

means for subtracting a previous value of the second slip limit from the maximum slip limit to obtain a differential slip limit;

means for limiting the magnitude of the differential slip limit to a predetermined value;

means for adding the limited differential slip limit to the previous value of the second slip limit to obtain an adjusted slip limit;

means for determining a maximum of the adjusted slip limit and the minimum slip limit;

means for, if the initial flux build up is not complete, determining the second slip limit as the minimum slip limit;

means for, if the initial flux build up is complete, determining the second slip limit as the maximum of the adjusted slip limit and the minimum slip limit.

11. A method of controlling an inverter to provide protection for an AC traction motor including a rotor and a stator comprising the steps of:

starting the inverter;

subtracting a previous value of a slip limit command from a maximum slip limit to obtain a differential slip limit;

limiting a magnitude of the differential slip limit to a predetermined value;

adding the limited differential slip limit to the previous value of the slip limit command to obtain an adjusted slip limit;

determining a maximum of the adjusted slip limit and a minimum slip limit;

if the initial flux build up is not complete, determining the slip limit command as the minimum slip limit;

if the initial flux build up is complete, determining the slip limit command as the maximum of the adjusted slip limit and the minimum slip limit; and using the slip limit command to control the inverter.

12. The method of claim 11, wherein the step of using the slip limit command to control the inverter includes:

calculating a motor torque limit;

estimating a vehicle speed of a vehicle powered by the motor;

using the slip limit command, the motor torque limit, the vehicle speed, and a predetermined maximum speed to determine a torque regulator slip positive limit; and providing a signal comprising the lower of the motor torque limit and the torque regulator slip positive limit to an inverter controller.

13. A propulsion system controller for an AC traction motor including an inverter, the controller comprising:

means for subtracting a previous value of a slip limit command from a maximum slip limit to obtain a differential slip limit;

means for limiting a magnitude of the differential slip limit to a predetermined value;

means for adding the limited differential slip limit to the previous value of the slip limit command to obtain an adjusted slip limit;

means for determining a maximum of the adjusted slip limit and a minimum slip limit;

means for, if the initial flux build up is not complete, determining the slip limit command as the minimum slip limit, and, if the initial flux build up is complete, determining the slip limit command as the maximum of the adjusted slip limit and the minimum slip limit; and means for using the slip limit command to control the inverter.

* * * * *